(12) United States Patent
Cihak et al.

(10) Patent No.: US 8,875,843 B2
(45) Date of Patent: Nov. 4, 2014

(54) ROBOTIC MILK BAR

(71) Applicants: Petr Cihak, Cakovicky (CZ); Jiri Pospisil, Dolni Lhota (CZ)

(72) Inventors: Petr Cihak, Cakovicky (CZ); Jiri Pospisil, Dolni Lhota (CZ)

( * ) Notice: Subject to any disclaimer, the term of this patent is extended or adjusted under 35 U.S.C. 154(b) by 0 days.

(21) Appl. No.: 13/872,764

(22) Filed: Apr. 29, 2013

(65) Prior Publication Data

US 2014/0157698 A1    Jun. 12, 2014

(30) Foreign Application Priority Data

Dec. 11, 2012    (CZ) .................................. 2012-892

(51) Int. Cl.
| | |
|---|---|
| A23C 3/02 | (2006.01) |
| A23C 3/033 | (2006.01) |
| B67D 7/80 | (2010.01) |
| E04H 3/04 | (2006.01) |
| E04H 5/08 | (2006.01) |

(52) U.S. Cl.
CPC .......................... E04H 5/08 (2013.01)
USPC .............. 186/38; 99/453; 222/146.1; 52/234

(58) Field of Classification Search
CPC ............. E04H 3/04; A01J 11/00; A23C 3/00; A23C 3/02; G05D 23/00
USPC ........ 186/33, 36, 38, 39, 49, 55, 56; 221/1, 2, 221/9, 10; 901/37, 39; 52/234; 700/90, 231, 700/232, 233, 239, 245, 248, 299, 300; 53/267, 268, 393; 426/34; 99/452, 453, 99/455, 483, 484; 62/56, 66, 132, 135; 222/1, 2, 52, 54, 146.1, 146.6
See application file for complete search history.

(56) References Cited

U.S. PATENT DOCUMENTS

| | | | |
|---|---|---|---|
| 7,891,290 B1 * | 2/2011 | Chatterjee et al. | 99/453 |
| 2010/0075013 A1 * | 3/2010 | Takata et al. | 426/565 |

* cited by examiner

*Primary Examiner* — Mark Beauchaine
(74) *Attorney, Agent, or Firm* — Jonathan A. Kidney; TechLaw, LLP (57) ABSTRACT

A robot milk bar as a modular technology which can be either operated as a stand-alone system installed in a modified sea freight containers and/or can be partly or totally installed and operated in any convenient shopping mall and/or shopping centers. The robot milk bar contains a milk processing line wherein the basic original milk products are made, while the distribution is ensured by an embedded robot filling, packing and vending line, in which an industrial robot prepares and distributes final milk products. The milk products are either distributed directly to consumers in own retail store/restaurant, or redistributed to retail outlets. The robot milk bar is unique in having its own retail store/restaurant where consumers can buy and consume milk and milk products via a user-friendly automatic ordering system and served by a robot.

16 Claims, 5 Drawing Sheets

ROBOTIC MILK BAR

CROSS-REFERENCE TO RELATED APPLICATIONS

This application claims the benefit of Czech Patent Application No. CZ 2012-892, titled "Robot Milk Bar," filed Dec. 11, 2012, the contents of which are hereby incorporated by reference in its entirety.

FIELD

The present invention is in the field of automatic milk distribution. More particularly to a robotic milk bar.

BACKGROUND

At present there are only "container" mini-dairies available in the market. These container-housed mini-dairies are used only as manual or semi-auto milk processing lines for the production of a variety of milk products before redistributing them to retail outlets. The absence of their own retail store and a need for manual work are the key disadvantages of container mini-dairies, which are intended for primary milk producers such as dairy farmers.

The operator of a mini-dairy generally manufactures high quality and fresh milk products which are needed by current markets, but usually fails in their marketing and in finding new ways of distribution, which is, if they are lucky, the majority market through retail outlets such as supermarket or hypermarket chains, whereas these products are discriminated by price against other mainstream, mass-produced or cheaper milk products. By doing this, the target customers for such products are not properly serviced and the operator of such a mini-dairy is not able to develop and compete on the market in a wider range. Further, container mini-dairies are primarily intended for small-scale family business farmers who usually have little or no knowledge and experience in marketing. Typically, the whole family is involved in milk processing, so there is little need to automate current mini-dairy systems in the current paradigm. Current mini-dairies are usually located at farms that are hard to access, and are not "drive-in" friendly. So all these facts set forth restrain mini-dairy products from being widely known.

Accordingly, there has been a long felt need in the mini-dairy industry for methods and systems that provide easier access to mini-dairy products in a less labor intensive environment, while providing better and cost-effective "marketing" to end customers. Methods and systems that address these and other concerns are detailed in the following description.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the present disclosure, a robot milk bar is provided, specific by the fact that it is made of four (4) functional parts: a background part which is space ready for a cloakroom, and/or office, and/or lab, and a central power-control unit; a milk processing part at least provided with a milk cooling tank, a liquid ring pump, a HTST plate pasteurizer, fermentation tanks, an ice cream base mix tank, an ice water machine with ice water pumps, a plate cooler, a compressor, stainless steel product pipelines and accessories, and CIP central tank for the cleaning of the robot filling, packing and vending line accessories; a robot filling, packing and vending part with an attached cold storage room and a stock for packagings which is automatically tempered in a range from four (4) to eight (8)° C., whereat the robotic filling, packing and vending line is at least provided with an industrial robot equipped with an appropriate rotary end effector, auto cup dropping stations, auto filling stations, an auto seal lid dropping station, an auto lid sealing station, an auto plastic lid dropping & pressing station, a belt conveyor, and automated vending windows; and a retail store/restaurant part comprising of a restaurant furniture with a capacity of at least forty (40) seats, a WC-bathroom, a kids corner, order & payment terminals, and on wall mounted LED panels, while all upper said parts are installed within an area of at least one thousand ninety one (1291) ft' and are at least partially interconnected.

In aspects of one or more other embodiments, the milk robot has one or more features of: wherein said industrial robot, with said rotary end effector, is capable to directly and autonomously prepare food products for customers; and/or said robot rotary end effector is a rotary device with said four (4) pneumatic grippers which hold and release cups, and these grippers are equipped with said optical sensors to check the presence of cups within; and/or said vending window is equipped with said germicidal lamp, said reflective light sensors and said bar code reader and is made, on both sides, of two said transparent sliding safety windows; and/or said order/payment terminals comprise said touch panel and said printer, and said payment devices for cash and/or non-cash payments such as a coin acceptor, a bill validator, a change giver, an online bank card reader, a RFID and/or bar code reader/writer, and/or mobile payment systems; and/or wherein all of the said units of the plant and their relative arrangement and positioning are such that they are capable of being cleaned in place without dismantling or disconnecting of pipes or otherwise; and/or wherein said robot end effector, said auto cup dropping stations, said auto filling stations, said auto seal lid dropping station, said auto lid sealing station, said auto plastic lid dropping & pressing station and said vending windows are fully or at least partly pneumatically operated; and/or wherein all said parts of the plant in direct touch with milk or milk products are made of stainless steel.

DETAILED DESCRIPTION

This disclosure describes an exemplary concept and plan of operation for the processing and distribution of milk in an economic, effective and efficient manner and embodiment(s) of implementing the exemplary concept and plan by way of particular equipment and facilities.

In addition to the foregoing, in its broader aspects, a design and lay-out of a building structure is described, which serves as a distribution point and also as a retail store/restaurant and which is laid out and/or constructed as to most effectively serve the purposes that the processed milk/original milk products may be unloaded from the mobile processing plant at the distribution point or in an adjacent retail store—restaurant; that the raw milk from a milk truck may be delivered and stored in the embedded milk cooling tank; that the processed milk/original milk products may be conveniently stored for distribution at the station; and that the customers may be most effectively served by an automated system or robot at the attached retail store/restaurant. As will be apparent, the concept and implementation thereof makes possible a complete and, in effect, a closed cycle of operation at the distributing station.

Full automatic vending using an industrial robot as an actual vendor is not only economically efficient as it saves human labor, but also the robot itself may play an important role in marketing and promotion of the system. The use of the term robot is broadly understood to encompass automated systems, as are well known in the industrial arts, and is not limited to a robot with arms and legs, as is the common public connotation.

The phenomenon of a direct interaction human-machine in a retail store has never been used in a worldwide range. Industrial robots are used mainly in industrial applications such as automobiles etc. If in direct interaction with a human, the human must be properly trained to work with the machine. Some robot makers have developed a safety robot concept, which is an industrial robot with safety software ready for direct interactions human-machine. However, there have been only very few limited cases when such robot application was used.

There has been one prior suggestion of a robot milk bar which is depicted in CZ patent 303,571, filed by the present inventor. In this patent, there is an industrial robot equipped with an end effector which can carry only one cup at a time, which means at least three (3) times slower operation and less performance, which is not sufficient in real life operation. Also, glasses used as packaging for products which is inconvenient due to the fact that they can be easily broken and are hard to sanitize—none of these disadvantages can be accepted by current retail operators, as this solution is not economically efficient and requires much investment into the packagings' automatic sanitation technology. There are also fermentation tanks, but they are also used for pasteurization of milk, which may cause an undesired "cooked" taste to the final pasteurized milk product, and their operation is generally less cost-efficient if compared to a high temperature short time (HTST) plate pasteurizer. The use of steam as a heating medium is currently considered as less-economic and less-convenient, since steam increases the milk temperature too quickly which may change typical milk characteristics and taste. Another important distinction of the patent is that its unit is not equipped with the possibility of making the products on stock. Rather, its production performance was dependent solely upon the customers who visit the adjacent retail store/restaurant and buy the products there. In contrast, in the current invention, the products are made and distributed also to the adjacent stock and at anytime can be redistributed. These features provide greater economic advantages in comparison to the prior patent approach.

The concept of a bar that serves milk was wide spread from 1920's to 70's of the $20^{th}$ century. With a rise of fast food chains and global retail concepts which changed average consumer's behavior and food preferences, classic milk bars almost disappeared. The milk bar has been present in former middle and Eastern Europe communist countries until the end of 1980's.

For instance, the decline of Australian milk bars and its reasons are solved in the article http://www.howretro.com/2011/06/old-milkbar.html (published Oct. 10, 2011). The brief article on the same issue, for Great Britain, can be found at http://hasardheureux.tumblr.com/post/1262941279/once-wasengland-black-white-milk-bar (published Oct. 10, 2011). A robot milk bar should play a key role in resurrection of a milk bar concept in the $21^{st}$ century with its "state of the art" technology.

An exemplary robot milk bar described herein resolves in a fully satisfactory manner the problems set forth in the above articles. To that end and more specifically, a robot milk bar can be comprised of four (4) basic functional parts:

a background part with a cloakroom, office, lab, central power-control unit;

a milk processing part with a pasteurizer, fermentation tanks, ice water machine, milk cooling tank, central sanitation "CIP" unit, pneumatic compressor, pipes and accessories;

a robot filling, packing and vending part with an attached cold storage room and a stock for packaging; and a retail store part with a restaurant space for direct consumption.

All these parts together can fit in an area of one thousand ninety one (1291) $ft^2$ and can be at least partially interconnected.

In one embodiment, raw milk brought by a milk truck is either pumped into the milk cooling tank where it can be stored for up to four (4) days, or directly to a HTST plate pasteurizer. The pasteurizer itself is able to provide three general product outputs: 1) to the fermentation tanks; 2) to the pasteurized milk storage tank; 3) to the ice cream base mix tank. After having been processed in the fermentation tanks, the pasteurized milk/basic original cultured milk product is pumped through the plate cooler to at least one storage tank which is located in a cold storage room of the robot filling, packing and vending part, whereat a condensing unit and an ice-water chiller is placed too. The storage tank is directly connected to the fermentation tank while being filled and sanitized. When full, the storage tank is moved and reconnected to the robot filling, packing and vending line and/or stored in a cold room, its content being continuously agitated. Said robot line is made of a square robot work area with an industrial robot mounted on the floor in the center of the area. Specific pneumatic rotary end effector to hold, carry and release cups are mounted in the end of the robot arm, on the turning disc. The robot work area is from three (3) sides surrounded by programmable logic controller (PLC) controlled electrically and pneumatically operated devices such as auto cup dropping stations, auto filling stations, auto cup (sealing) alu lid dropping station, auto cup alu lid sealing station, and auto plastic lid dropping and pressing station. There are touch-screen operated payment terminals and vending windows where customers can get packed products. Said robot work area is also equipped with a belt conveyor which transports paper cup boxes to the filling position, and when they are filled with milk products, they are transported by the conveyor belt to the cold storage room.

A robot milk bar can perform multiple functions at the same time—for example, a milk processing, a storage and distribution of milk products, a robot filling, a robot packing and a robot direct vending in the retail store/restaurant part of the concept. The embodiment supports both 1) redistribution of processed milk/milk products to retail outlets, 2) direct distribution to consumers in the retail store/restaurant.

In one embodiment, the robot milk bar contains a robot filling, packing and vending line with a robot work area. Said industrial robot is equipped with a food-safety pneumatic end effector with four (4) grippers to hold and release cups. The robot work area further contains automatic filling machines to fill, for example, pasteurized milk, cultured milk products, ice cream, organic flavor additives such as fruit syrup, jam, jelly, honey, cocoa paste etc., and of automatic cup dropping machines, and of an automatic seal lid dropping machine, and of an automatic cup sealing machine, and eventually of an auto plastic lid dropping and pressing machine. The industrial robot may be equipped with a sensor to detect objects in its work range.

Vending windows and payment terminals can be located in the retail store/restaurant part. Said robot puts packed products into the vending windows. The payment terminals are touch controlled and provide user friendly interface for consumers. There are multiple payment options enabled such as coin accepting, bill validating, bank card payments, smart phone online/offline payment. An embedded microprinter prints out the bill per each purchase realized. In a three-step full automatic vending procedure, at first consumers select the product they like while being clearly informed on the price, second they select the most convenient payment method and pay, and third they get a receipt with an ID number and a bar code, and last when their ID is visually or audibly announced via a LED panel, they can go to the vending window and get their ordered products from the robot.

Most of the parts of the exemplary system are fully automated and controlled by PLC units. It is estimated that only two (2) people are needed to operate the whole system. Thanks to the state of the art in automation, the retail store/restaurant may be open 24/7. In one embodiment, there can be at least 40 seats for consumers, a small restroom with a chemical or water flush toilet, and a children's corner in the retail store/restaurant, if so desired.

In one or more embodiments, such a robot milk bar provides several benefits: milk processing and multiple distribution is realized in one place; mobility; operability by a wide range of subjects from farmers to retailers; minimizes human labor; a state of the art in automation; global use; health food. The embodiment(s) bring a new use of an industrial robot arm in food retail industry while developing a high level human-machine interface, and achieves the economic result and objective of delivering a raw product directly from the point of production from the farm to the point of sale, in bulk and directly to the ultimate consumer, without having to go to an intermediate processing plant and then be redistributed. With some modifications, the embodiment(s) can be used to process and distribute other kinds of food or casually non-food products.

Figure 1:
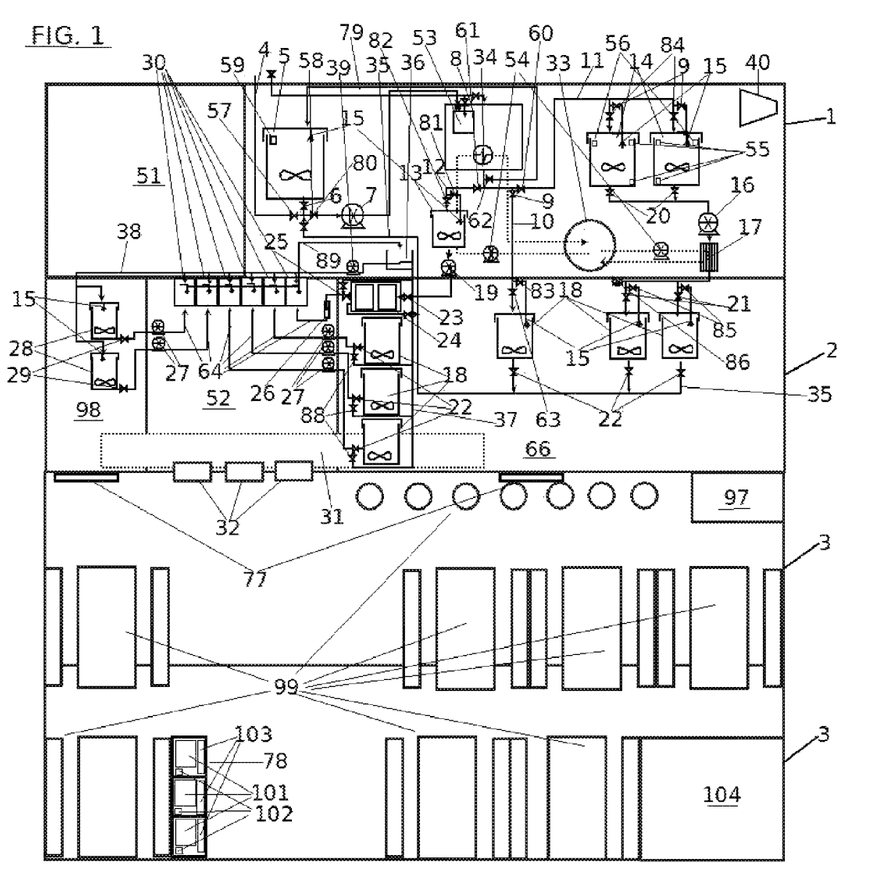
FIG. 1 is a schematic plan view of an exemplary robot milk bar complete unit depicting milk being processed flow paths, water flow paths, and Clean In Place (CIP) flow paths and showing the equipment used.
Figure 2:
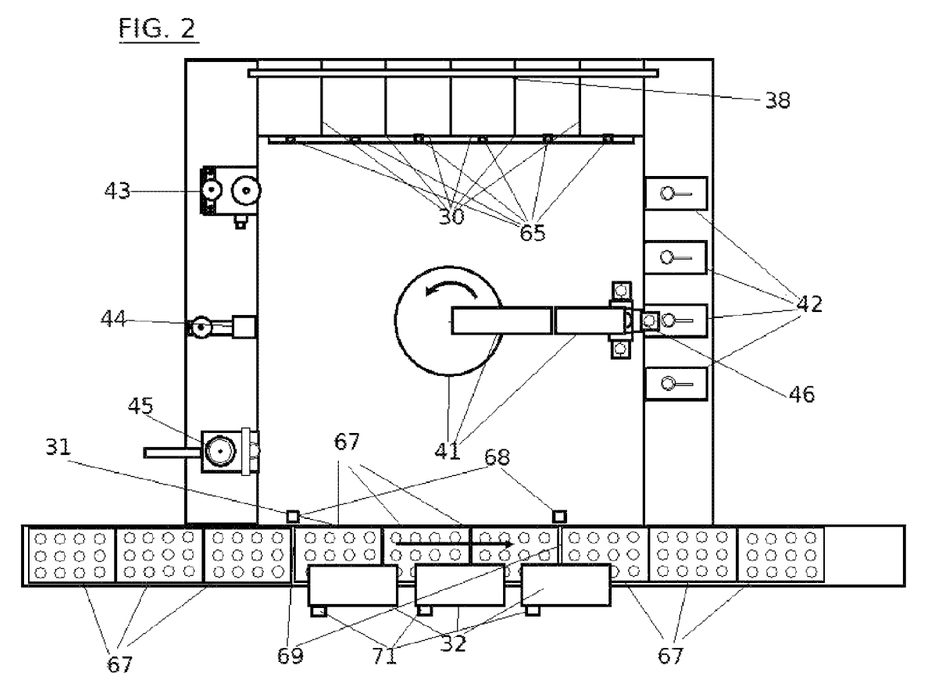
FIG. 2 is a schematic plan view of the exemplary robot filling, packing and vending line depicting the equipment and process directions.
Figure 3:
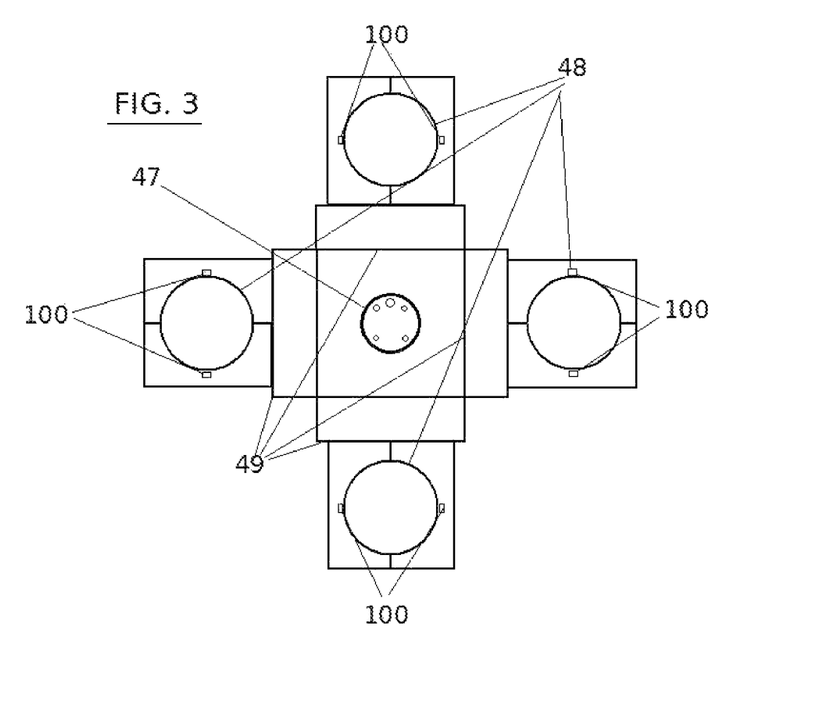
FIG. 3 is a detailed plan view of an exemplary robot rotary end effector consisting of four (4) pneumatically actuated grippers.
Figure 4:
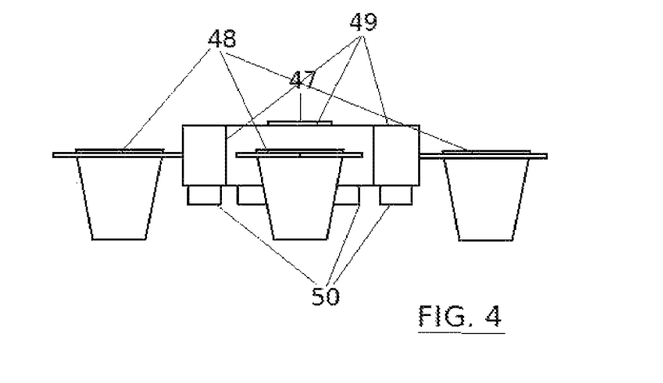
FIG. 4 is a detailed side view of an exemplary robot rotary end effector.

Referring now to the drawings, it should be noted that the exemplary robot milk bar of the present invention can be disposed in four (4) modified forty (40) foot containers and functionally is also divided into four (4) parts. Of course, other sizes and configurations are possible. In one embodiment, there is a cloakroom, bathroom, lab, and a central power-control unit in the background part 51. As shown in FIG. 1 the milk processing part 1 basically comprises of a detachable raw milk inlet hose 4, milk cooling tank 5 with a level sensor 59, a liquid ring pump 7, a plate pasteurizer 8, fermentation tanks 14, an ice cream base mix tank 13, an ice water machine 33 with ice water pumps 54, a plate cooler 17, a compressor 40, and CIP central tank 36 for the cleaning of the robot filling, packing and vending line 52 accessories. The capacity of the milk cooling tank 5 is preferably 1000 Liters and can be open/closed by a pneumatic butterfly valve 6. The performance of liquid ring pump 7 is preferably 5000 Liters per hour and is used either to supply the milk to the balance tank 53 of the plate pasteurizer 8, or as a clean in place (CIP) return pump. The pasteurizer balance tank 53 is also used as a CIP central tank of the main CIP line 35. The plate pasteurizer 8 is a conventionally designed and operated as an automatic unit with a capacity 500 Liters per hour (other capacities may be utilized) and specifically programmed to provide two (2) different pasteurization temperatures, two (2) different holding times, two (2) different product output temperatures, and three (3) different product exit ways—directly to the storage tank 18, to the ice cream base mix tank 13, and to the fermentation tanks 14. Of course, more or less temperatures, times, etc. may be utilized, according to design preference. Conventional electrically heated jacketed double-wall fermentation tanks 14 can be used. The fermentation tank 14 has on top a CIP spraying unit 15 and it is also equipped with level sensors 55 and a temperature sensor 56 which are also PLC controlled. As shown in FIG. 1 and FIG. 2, the robot filling, packing and vending part with a storage 2 is subdivided into a cold storage room 66, a robot filling, packing and vending line 52, and a storage room 98 for new empty packagings and flavour storage tanks 28. All the parts 66, 52 and 98 are kept refrigerated with a temperature control from four (4) to ten (10)° C. A first set of three (3) product storage tanks 18 and an ice cream machine 24 are located in the cold storage room 66 and are connected to the robot filling, packing and vending line 52. Second set of three (3) storage tanks 18 is in position attached to the milk processing part 1 either being filled or sanitized. The tanks 18 are manually moved between the two positions set forth if they have been emptied and/or filled. The products made by the robot line 52 are transported by the belt conveyor 31 to the cold or storage room 66, 98 where can be manually or automatically sorted and stocked. The robot line 52 is provided with a robot 41 equipped with an end effector 46, four (4) auto cup dropping stations 42, six (6) auto filling stations 30, an auto seal lid dropping station 43, an auto lid sealing station 44, an auto plastic lid dropping & pressing station 45, a belt conveyor 31, and vending windows 32. The storage room 98 has enough space to put in at least two (2) euro pallets of packagings and typically two (2) flavour storage tanks 28. Numeral 3 designates a retail store with a restaurant space which is typically equipped with restaurant furniture with a capacity of at least forty (40) seats, a WC-bathroom 97, a kids corner 104, order & payment terminals 78, and on wall mounted LED panels 77.

The main criteria on the walls and ceilings internally is that the surfaces are of non-absorbent material, smooth and impervious to absorbing of any soil of any nature. All fixtures or facilities, similarly, are appropriately constructed to meet all legal code requirements. All of the units of the plant and their relative arrangement and positioning are such that they are capable of being cleaned in place without dismantling or disconnecting of pipes or otherwise. All the parts which are in direct touch with milk and/or milk products are made of stainless steel or other easy to sanitize material.

The sanitation system of the embodiments is divided into two independent parts. Part one is intended to clean the equipment and accessories in the milk processing part 1 and also the storage tanks 18. Part two is intended to clean the equipment and accessories of the robot filling, packing and vending line 52 and the flavour storage tanks 28.

The cleaning of the milk processing part 1 and the storage tanks 18 is carried out in the following manner. Cleaning solutions—water and water with detergent 0.5% concentration are prepared in the pasteurizer 8 balance tank 53. The cleaning process has typically three (3) steps: in the step 1 only cold water is circulated in the system, in the step 2 detergent hot water solution is circulated in the system and in the step 3 cold water is circulated again to wash out the system of all the residues. There are also 4 different circulation circuits.

In the first circuit, cleaning solution is pumped through the pasteurizer 8 to the open pneumatic butterfly valve 62 while the valves 61, 60 and 9 are closed, via the C.I.P line 79 through the spraying head 15 into the milk cooling tank 5, then it flows via the valve 58 (the valves 57 and 80 are kept closed) and through the circulation/milk pump 7 back to the pasteurizer 8 balance tank 53.

In the second circuit, cleaning solution is pumped through the pasteurizer 8 to the open pneumatic butterfly valve 61, while the valves 62, 9, 60 are kept closed, via the sanitation valve 81 on the line 12, the product inlet valve 82 is closed, through the spraying unit 15 into the ice cream base mixture tank 13. The circuit continues via the product pump 19 and the product outlet valve 23 into the ice cream machine 24, then into the CIP return line 35 and through the open valve 80 (the valves 57 and 6 are closed) and via the circulation milk/CIP pump 7 back to the pasteurizer 8 balance tank 53.

In the third circuit cleaning solution is pumped through the pasteurizer 8 to the open pneumatic butterfly valve 9, and then through the milk line 10 into the manually open sanitation valve 83, while the product inlet valve 63 is closed, and through the spraying unit 15 into the storage tank 18, further the cleaning solution flows through the product outlet valve 22 into the CIP return line 35. The rest of the circuit was set forth in the circuit 2 description.

In the fourth circuit, cleaning solution is pumped through the pasteurizer 8 to the open pneumatic valve 60, then it flows via the line 11 through the sanitation valves 9, while product inlet valves 84 are closed, and spraying units 15 into the fermentation tanks 14. Afterwards it flows through the product outlet valves 20, the product pump 16 and the plate cooler 17 to the storage tanks 18 whereat the manual sanitation valves 85, leading to the spraying units 15, are open, while the product inlet valves 21 are closed, then it flows through the product outlet valve 22 into the CIP return line 35. The rest of the circuit was set forth in the circuit 2 description.

All the circuits set forth can be emptied by opening the manual butterfly valve 57 which is in the lowest position of the CIP line 35 and situated above the sewage exit point. The fourth circuit can be also partly emptied by the safety valve 86.

Figure 7:
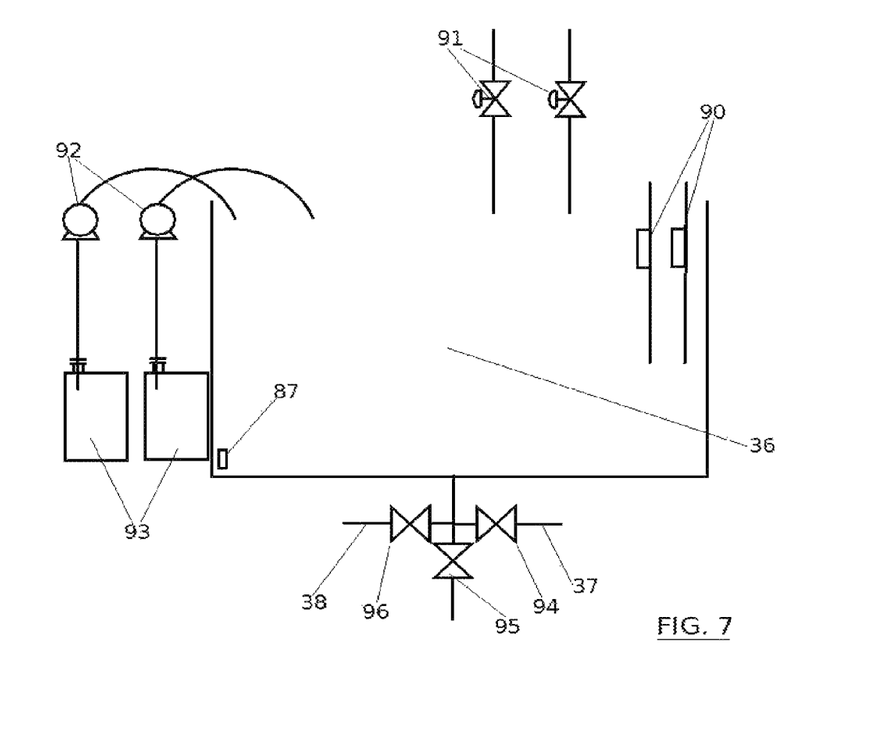
FIG. 7 is a schematic cross-section view of a central sanitation tank.

The cleaning of the robot filling, packing and vending line 52 and the storage tanks 28 is done in two separate circuits and starts in the central sanitation tank 36 which is further described in FIG. 7, and is provided with two (2) level sensors 90 for cold water and hot water solution, a temperature sensor 87, two (2) solenoid valves 91 for cold and hot water respectively, two (2) peristaltic pumps 92 for acid and alkaline-based detergent from the cans 93, an exit solenoid valve 95, a sanitation valve 96 for the circuit one (1) and a sanitation valve 94 for the circuit two (2). The valves 95, 96 and 94 should be automatically controlled.

In the circuit one (1) the cleaning solution, from a central sanitation tank 36, is sucked in the system by the product filling pumps 27, 26 and flows in the CIP line 37 through the manually opened sanitation valves 88, while the product outlet valves 22 are closed, directly to the hoppers of automatic filling stations 30 and by its filling heads 65 out to the CIP return line 89 and by gravity flows back to the tank 36.

In the circuit two (2) the cleaning solution is circulated by the CIP pump 39 in the CIP line 38, then it is sprayed by spraying nozzles installed on top of hoppers of the automatic filling stations 30, and it also flows into the liquid flavour storage tanks 28 where it is sprayed by spraying heads 15 and via the outlet valve 29 and product filling pumps 27 goes into the automatic filling station 30 hoppers and through the filling heads 65 it is flown by gravity back to the tank 36.

The following cases, which in describe the manner in which raw milk can be processed in the robot milk bar, are for illustrative purposes and are understood not to be limiting to how the embodiment may process raw milk, as multiple other approaches may be devised, according to design preference.

Case 1—Non-Flavoured Whole Pasteurized Milk Production

Raw milk is pumped from a milk truck by a hose which is connected to the system at the input manual butterfly valve 57. Raw milk is firstly pumped into the milk cooling tank 15 through the pneumatic butterfly valve 6, after the level sensor 59 signals that the tank 15 is full the valve 6 is closed, and some volume of raw milk can be pumped through the pneumatic butterfly valve 58 and through the milk pump 7 directly to the balance tank 53 of the plate pasteurizer 8. The valves 6 and 58 are controlled by the pasteurizer 8 central programmable logic controller (PLC). The operation of the pasteurizer 8 is conventional, milk is pumped from the balance tank 53 through the heating section of the desk heat exchanger to the flow divert valve where it is returned back to the balance tank 53 unless the required pasteurization temperature of approximately seventy two (72)° C. and holding time of approximately twenty (20) seconds is reached, then a flow divert valve directs the milk through the cooling section 34 to another flow divert valve and out of the pasteurizer when the required product outlet temperature of approximately four (4)° C. is reached, or the milk overflowed is returned to the balance tank 53. The cooling is made at the integrated heat exchanger 34 by ice water which is made in the ice water machine 33 and is circulated by an ice water pump 54 through the ice water lines. Pasteurized milk at approximately four (4)° C. is then transported through the open pneumatic butterfly valve 9 directly to the pasteurized milk storage tank 18 while the valves 60, 61, 62 are kept closed.

Pasteurized milk is stored at a storage tank 18 in the cold storage room 66 of the robot filling, packing, vending and storage part 2 at temperature of approximately 4-8° C. The storage tank 18 is connected via top-lid mounted manual butterfly valve 63 and the stainless steel line 10 to the pasteurizer 8. Said storage tank 18 is then moved to the robot filling, packing and vending line 52 where is connected via an exit manual butterfly valve 22 to the line 64 and pasteurized milk is then transported by a product pump 27 into the hopper of an automatic filling station 30. PLC commands the robot 41 to go to the position of auto cup dropping stations 42 whereat a cup is dropped into the gripper 48 of the robot end effector 46. The robot end effector 46 is mounted on a robot $7^{th}$ ax flange 47, and has four (4) robot grippers 48 which are operated by pneumatic cylinders 49 controlled by electromagnetic 24VDC valves 50. Each gripper 48 is also equipped with an object detection analog sensor 66. The cup held by the gripper 48, the robot 41 moves to a filling head 65 of the automatic filling station 30, when the gripper 48 with a cup is in the filling position, the robot 41 signals to the PLC, which switches the auto filling station 30 on, to fill a preset dose of the pasteurized milk, the auto filling station 30 signals to the PLC when the operation is finished. The auto filling station 30 works in a known manner using two actuated pneumatic cylinders controlled by two electromagnetic 24VDC valves while the dose level is manually preset on the dosing cylinder. The cup with pasteurized milk is then carried by the robot 41 to the auto seal lid dropping station 43 whereat a seal lid is dropped onto the cup still held by the gripper 48.

The specific operation of auto seal lid dropping station 43 of the present invention is such that a pneumatic cylinder is actuated and turns the suction grabbing head upwards towards a seal lid down in a vertical hopper, the vacuum is activated by the pneumatic ejector and the suction grabbing head, with a seal lid sucked on, goes back downwards until a seal lid is in the centered position above the cup rim. Then the vacuum is switched off. In next step the robot 41 moves to the auto lid sealing station 44 where the seal lid is sealed onto the cup rim. The auto lid sealing station 44 is a conventional designed device with one pneumatic cylinder, controlled via a solenoid valve, which moves the sealing copper head consisting of heating elements down towards the position where the cup with a lid on is held by the gripper 48, while pressing down and heating at preset sealing temperature, the seal lid is sealed tight onto the cup rim.

This operation finished, the robot 41 is commanded to move to the auto plastic lid dropping & pressing station 45 wherein a plastic lid is put onto the sealed cup and pressed down so the lid be fitted over the cup rim. The station 45 operates in a known manner using two pneumatic cylinders, actuated via two solenoid valves, while one of the cylinders divides the plastic lid from a column and makes it out, and the other cylinder is used to press down a dropped lid onto the cup. That is the end of a filing and packing procedure.

From this point on, packed cups are either dropped into the carton cup box 67 and transported by the conveyor 31 to the cold storage room 66, or put into the vending window 32 whereat customers can pick it up. In the first case robot 41, ideally carrying in all four (4) grippers 48 closed/sealed cups with milk products, is commanded to move to a position above the belt conveyor 31, where are placed and transported carton cup boxes 67. When three (3) carton cup boxes 67 are in the robot 41 cup dropping position, which is defined by signals from optical sensors 68 and physically made by on-belt mounted dividers 69, the robot is initiated to go with a gripper 48 above the cup hole in the carton box 67 and the cup is dropped into the hole by releasing of gripper 48 jaws. Each position/cup hole which has already been filled with a cup is stored by the PLC application, when all three (3) carton cup boxes 67 are filled with cups, they are transported by the belt conveyor 31 to the cold room 66 and stocked.

Figure 5:
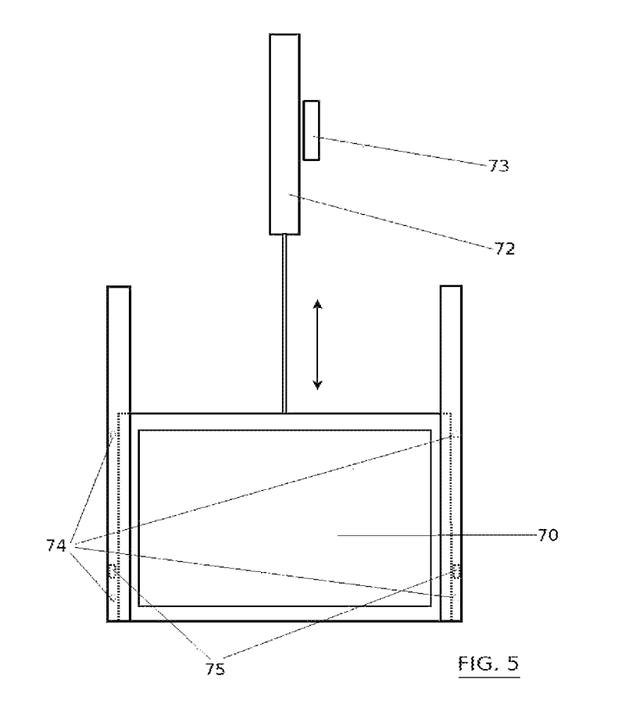
FIG. 5 is a front view of a vending window.
Figure 6:
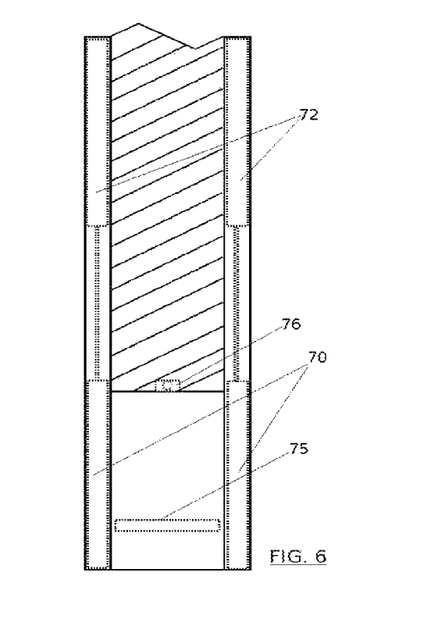
FIG. 6 is a cross-section view of a vending window.

In the second case, prior to a direct robot vending to consumers, a consumer's order must be made at the order/payment terminal 78 whereas a receipt with an ID and bar code is printed out, then the robot 41, carrying cup(s) with ordered products, moves to the vending window 32. The vending window 32 is provided with two (2) safety transparent sliding windows 70 with embedded sliding rollers 74, two (2) pneumatic cylinders 72 with a control solenoid valve 73, a germicidal lamp 76 and reflective light sensors 75. The safety window 70 on the side of a robot work area 52 is slided up as soon as the robot 41 gripper 48 is moved into the vending window 32 and the cup is dropped into the position defined by a reflective light sensor 75. Cup(s) in position, the gripper 48 is moved out of the vending window 32, the safety window 70 is slid down and a particular order ID is announced on the LCD displays 77. The consumer with such ID on the receipt may approach the vending window 32 and have the barcode reader 71 check the barcode printed on her/his receipt, the barcode read, the safety window 70 on the side of a retail store 3 may be slid up and the consumer can take the cups out of the vending window 32, when an inner space is empty (cups have been take away), which is recognized by the reflective light sensors 75, the safety window 70 is slid down, the germicidal lamp 76 is switched on for a preset time and, when switched off, the vending window 32 is empty and ready for next customer.

Case 2—Flavoured Whole Pasteurized Milk Production

The procedure is almost the same as in case 1 with the difference that there is also a liquid flavour portion added to the pasteurized milk by an automatic filling station 30.

Case 3—Milkshake Production

The procedure is such as in case 2 with the difference that there is also an ice cream portion added to the flavoured pasteurized milk by another automatic filling station 30.

Case 4—Ice Cream/Gelato Production

The procedure is almost the same as in case 1 with the following differences: Pasteurized milk, leaving the pasteurizer at temperature which may vary from approximately twenty-five (25) to approximately forty-five (45)° C., is then transported through the open pneumatic butterfly valve 61 and product inlet valve 82 directly to the ice cream base mixture tank 13 while the valves 60, 9, 62 are kept closed. The capacity of the base mixture tank 13 is typically one hundred (100) liters, but may vary. Ice cream base mixture ingredients are added/dosed to the pasteurized milk and the desired base mix is constantly agitated while getting cold to four (4) to eight (8)° C. Base mix is then pumped out by the dosing product pump 19 and flown through the no-return valve 23 into the gelato/ice cream making machine 24.

The ice cream making machine 24 is a component which may be of type well known commercially with two principle requirements: it must combine functions of a batch pasteurizer (heating) and a batch freezer (freezing), and must have two (2) processing speeds—low for Italian gelato, and high for overrun American ice-creams. The ice cream and/or gelato is typically processed in ten (minutes) and desired final flavour is added to the base mix before the processing starts in the machine 24. Then the product outlet valve 25 is opened and final product is pumped by, preferably, a piston pump 26 into the hopper of one of automatic filling stations 30. The rest of the procedure is same as in case 1, only with a modification that the ice cream/gelato must be kept filled and packed until the hopper of automatic filling station 30 is empty. The reason is that this product melts quickly.

Case 5—Non-Flavoured Yogurt Production

The procedure is almost the same as in case 1 with the following differences: The operation of the pasteurizer 8 is conventional, milk is pumped from the balance tank 53 through the heating section of the desk heat exchanger to the flow divert valve where it is returned back to the balance tank 53 unless the required pasteurization temperature of approximately eighty-three (83)° C. and holding time of approximately twenty (20) seconds is reached, then a flow divert valve directs the milk through the cooling section 34 to another flow divert valve and out of the pasteurizer when the required product outlet temperature of twenty-five (25)° C. is reached, or the milk overflowed is returned to the balance tank 53. Pasteurized milk, leaving the pasteurizer at temperature of twenty-five (25)° C., is then transported through the open pneumatic butterfly valve 60 and product inlet valve 84 directly to the fermentation tank 14 while the valves 61, 9, 62, and also the sanitation valve 9, are kept closed.

The yogurt cultures, either in form of liquid or powder, are dosed into the fermentation tank 14 and the agitation is started. The tank is also equipped with a temperature sensor 56, and level sensors 55. The temperature of cultured milk must be kept constant of approximately twenty-five (25)° C. during the whole fermentation period which typically takes about approximately ten (10) to twelve (12) hours. The fermentation temperature may also vary from approximately twenty-five (25) to thirty (30)° C. Fermentation finished, the product is flown out through the open product outlet valve 20, and a product pump 16. To get a required storage temperature of approximately four (4) to eight (8)° C., the product flows through the plate cooler 17, which is connected to the ice water machine 33. Thereafter, the cold product flows via the product inlet valve 21 ending in the product storage tank 18. The rest of the procedure is the same as in case 1.

Case 6—Flavoured Yogurt Production

The procedure is such as in case 5 with the difference, that there is also a liquid flavour portion added to the product by an automatic filling station 30.

Case 7—Non-Flavoured Probiotic Drink Production

The procedure is such as in case 5 with the following differences: pasteurized milk, leaving the pasteurizer at temperature of approximately forty (40) to forty-five (45)° C., is then transported through the open pneumatic butterfly valve 60 and product inlet valve 84 directly to the fermentation tank 14 while the valves 61, 9, 62, and also the sanitation valve 9, are kept closed. The temperature of cultured milk must be kept constant of approximately forty (40)° C. during the whole fermentation period which typically takes approximately twenty (20) to twenty-two (22) hours. The fermentation temperature may also vary from approximately thirty-eight (38) to forty-five (45° C. The rest of the procedure is such as in case 1.

Case 8—Flavoured Probiotic Drink Production

The procedure is such as in case 7 with the difference, that there is also a liquid flavour and/or ice cream portion added to the product by automatic filling stations 30.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A robot milk bar comprising four (4) functional parts:
   a background part comprising a cloakroom, office, lab, central power-control unit;
   a milk processing part comprising a milk cooling tank, a liquid ring pump, a HTST plate pasteurizer, fermentation tanks, an ice cream base mix tank, an ice water machine with ice water pumps, a plate cooler, a compressor, stainless steel product pipelines, and a CIP central tank for cleaning of a robot filling, and packing and vending line accessories;
   a robot filling, packing and vending part comprising an attached cold storage room and a stock for packaging which is automatically maintained at a temperature range from approximately four (4) to eight (8)° C., whereat the robotic filling, packing and vending part is at least provided with an industrial robot equipped with a rotary end effector, auto cup dropping stations, auto filling stations, an auto seal lid dropping station, an auto lid sealing station, an auto plastic lid dropping & pressing station, a belt conveyor, and automated vending windows; and
   a retail store/restaurant part comprising a restaurant furniture with a capacity of at least forty (40) seats, a WC-bathroom, a kids' corner, order and a payment terminal, and an on wall mounted display panel,
   wherein all said parts are installed within an area of at least one thousand ninenty one (1291) ft$^2$ and are at least partially interconnected.

2. The robot milk bar of claim 1, wherein said vending window is equipped with a germicidal lamp, reflective light sensors and bar code reader and is made, on both sides, of two transparent sliding safety windows.

3. The robot milk bar of claim 1, wherein said order and payment terminals comprise a touch panel and printer, and payment devices for cash and/or non-cash payments comprising at least one of a coin acceptor, a bill validator, a change giver, an online bank card reader, a RFID and/or bar code reader/writer, and/or mobile payment systems.

4. The robot milk bar of claim 1, wherein at least one of the parts is arranged and positioned are such that it is capable of being cleaned in place without dismantling or disconnecting attached pipes.

5. The robot milk bar of claim 1, wherein said robot end effector, said auto cup dropping stations, said auto filling stations, said auto seal lid dropping station, said auto lid sealing station, said auto plastic lid dropping and pressing station and said vending windows are fully or at least partly pneumatically operated.

6. The robot milk bar of claim 1, wherein any element or part in direct touch with milk or milk products is made of stainless steel.

7. The robot milk bar of claim 1, wherein said robot rotary end effector is a rotary device with four (4) pneumatic grippers which hold and release cups, and these grippers are equipped with one or more optical sensors to check a presence of cups within.

8. The robot milk bar of claim 7, wherein said robot end effector, said auto cup dropping stations, said auto filling stations, said auto seal lid dropping station, said auto lid sealing station, said auto plastic lid dropping and pressing station and said vending windows are fully or at least partly pneumatically operated.

9. The robot milk bar of claim 1, wherein said rotary end effector, is capable of directly and autonomously preparing food products for customers.

10. The robot milk bar of claim 9, wherein said robot rotary end effector is a rotary device with four (4) pneumatic grippers which hold and release cups, and these grippers are equipped with one or more optical sensors to check a presence of cups within.

11. The robot milk bar of claim 10, wherein said robot end effector, said auto cup dropping stations, said auto filling stations, said auto seal lid dropping station, said auto lid sealing station, said auto plastic lid dropping and pressing station and said vending windows are fully or at least partly pneumatically operated.

12. The robot milk bar of claim 9, wherein said vending window is equipped with a germicidal lamp, reflective light sensors and bar code reader and is made, on both sides, of two transparent sliding safety windows.

13. The robot milk bar of claim 9, wherein said order and payment terminals comprise a touch panel and printer, and payment devices for cash and/or non-cash payments comprising at least one of a coin acceptor, a bill validator, a change giver, an online bank card reader, a RFID and/or bar code reader/writer, and/or mobile payment systems.

14. The robot milk bar of claim 9, wherein at least one of the parts is arranged and positioned are such that it is capable of being cleaned in place without dismantling or disconnecting attached pipes.

15. The robot milk bar of claim 9, wherein said robot end effector, said auto cup dropping stations, said auto filling stations, said auto seal lid dropping station, said auto lid sealing station, said auto plastic lid dropping and pressing station and said vending windows are fully or at least partly pneumatically operated.

16. The robot milk bar of claim 9, wherein any element or part in direct touch with milk or milk products is made of stainless steel.

* * * * *